(12) United States Patent
Motozaki et al.

(10) Patent No.: US 9,366,314 B2
(45) Date of Patent: Jun. 14, 2016

(54) COVER FABRIC FOR POWER TRANSMISSION BELT AND TOOTHED BELT

(71) Applicant: Mitsuboshi Belting Ltd., Kobe-shi, Hyogo (JP)

(72) Inventors: Akihiko Motozaki, Hyogo (JP); Akira Takenaka, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 245 days.

(21) Appl. No.: 13/918,500

(22) Filed: Jun. 14, 2013

(65) Prior Publication Data

US 2013/0337956 A1    Dec. 19, 2013

(30) Foreign Application Priority Data

Jun. 18, 2012  (JP) ................ 2012-136724

(51) Int. Cl.

| | |
|---|---|
| *F16G 1/04* | (2006.01) |
| *D03D 1/00* | (2006.01) |
| *D03D 15/00* | (2006.01) |
| *D03D 15/08* | (2006.01) |
| *D03D 15/10* | (2006.01) |
| *F16G 1/08* | (2006.01) |
| *F16G 1/28* | (2006.01) |

(52) U.S. Cl.
CPC ............... *F16G 1/04* (2013.01); *D03D 1/0094* (2013.01); *D03D 15/0027* (2013.01); *D03D 15/08* (2013.01); *D03D 15/10* (2013.01); *F16G 1/08* (2013.01); *F16G 1/28* (2013.01); *D10B 2321/02* (2013.01); *D10B 2331/02* (2013.01); *D10B 2505/02* (2013.01)

(58) Field of Classification Search
CPC ............... F16G 1/04; F16G 1/08; F16G 1/28; D03D 15/0027; D03D 15/08; D03D 15/10; D03D 1/0094
USPC .................... 474/205, 268; 264/146
See application file for complete search history.

(56) References Cited

U.S. PATENT DOCUMENTS

| | | | |
|---|---|---|---|
| 6,572,505 B1 | 6/2003 | Knutson | |
| 7,056,249 B1 * | 6/2006 | Osako et al. | .................. 474/260 |
| 7,892,468 B2 * | 2/2011 | Yoshida | ........................ 264/146 |

(Continued)

FOREIGN PATENT DOCUMENTS

| | | |
|---|---|---|
| CN | 101070895 A | 11/2007 |
| CN | 101487511 A | 7/2009 |

(Continued)

OTHER PUBLICATIONS

European Search Report for corresponding European Patent Application No. 13172250.6.

(Continued)

*Primary Examiner* — William E Dondero
*Assistant Examiner* — Robert T Reese
(74) *Attorney, Agent, or Firm* — Wood, Phillips, Katz, Clark & Mortimer

(57) ABSTRACT

The present invention relates to a cover fabric for power transmission belt, which covers at least a part of working surface of a power transmission belt coming into contact or engage with a pulley and thereby transmitting power, in which the cover fabric contains a yarn, the yarn contains at least a fluorine-based fiber, and the fluorine-based fiber is formed of at least one slit yarn, and the cover fabric is subjected to an adhesion treatment.

9 Claims, 4 Drawing Sheets

(56) References Cited

U.S. PATENT DOCUMENTS

| | | | |
|---|---|---|---|
| 7,985,152 B2* | 7/2011 | Di Meco et al. | 474/205 |
| 8,357,065 B2* | 1/2013 | Duke et al. | 474/205 |
| 8,568,260 B2* | 10/2013 | Baldovino et al. | 474/205 |
| 8,871,329 B2 | 10/2014 | Yoshida et al. | |
| 2007/0178792 A1* | 8/2007 | Yoshida et al. | 442/293 |
| 2008/0318719 A1* | 12/2008 | Izu et al. | 474/205 |
| 2010/0102480 A1 | 4/2010 | Yoshida | |
| 2010/0120566 A1* | 5/2010 | Izu et al. | 474/148 |
| 2011/0003659 A1* | 1/2011 | Wu et al. | 474/250 |
| 2012/0071286 A1* | 3/2012 | Pasch | 474/205 |

FOREIGN PATENT DOCUMENTS

| | | |
|---|---|---|
| DE | 102004062725 A1 | 6/2006 |
| EP | 1813835 A2 | 8/2007 |
| EP | 2006574 A2 | 12/2008 |
| JP | 2004-044642 A | 2/2004 |
| JP | 2005-240862 A | 9/2005 |
| JP | 2007-232208 A | 9/2007 |
| JP | 2008-291205 A | 12/2008 |
| JP | 2009-257344 A | 11/2009 |

OTHER PUBLICATIONS

Office Action issued on Nov. 12, 2014, in corresponding European patent application No. 13172250.6.
Office Action dated Jun. 30, 2015 in corresponding Chinese patent application No. 201310241656.8.
Office Action "Notification of Reasons for Refusal", dated May 26, 2015, for corresponding application JP-2012-136724.
Office Action dated Aug. 27, 2015 in Japanese Patent Appln. No. 2012/136724.

* cited by examiner (A)    (B)

(A-1)

D (B-1)

D (A-2)

D (B-2)

D

COVER FABRIC FOR POWER TRANSMISSION BELT AND TOOTHED BELT

TECHNICAL FIELD

The present invention relates to a cover fabric for power transmission belt, which covers a power transmission belt, and a toothed belt using the cover fabric.

BACKGROUND ART

The endless power transmission belt wound onto a pulley includes, for example, V belts (e.g., wrapped belts, raw edge belts, raw edge cogged belts), V-ribbed belts, flat belts, and the like which transmit power by the frictional force at contact surface with the pulley, and toothed belts which transmit power by engaging with teeth of the pulley. In many of these power transmission belts, in order to transmit power from a driving pulley to a driven pulley and to reinforce a rubber-made belt body, a tension member extending in the circumferential direction is embedded in the belt and at the same time, working surface of the belt coming into contact or engage with the pulley is covered with a cover fabric such as canvas. In some cases, the whole circumference of the belt body including the working surface is covered with a cover fabric. In the toothed belt, tooth parts engaging with teeth of the pulley are provided at predetermined intervals in the circumferential direction of a belt body, and a tension member is embedded in the back part lying in the circumferential direction on the back side of the belt body.

The toothed belts are often used in a belt drive mechanism for driving an automotive engine camshaft, injection pump, oil pump, water pump and the like. In association with the recent increase in engine power output, the load on the belt is increased and at the same time, the usage environment for the belt becomes harsh due to, for example, the increase in ambient temperature involved in downsizing of the engine room. In addition, also in a large two-wheeled vehicle, shift from a chain or shaft drive to a belt drive using a toothed belt is recently proceeding. Therefore, toothed belts used for vehicles are required to be more enhanced in durability. Furthermore, it is required also for toothed belts used in general industrial machines to extend the replacement cycle in high-load applications such as injection molding machine and to enhance the durability.

The damage mode of the toothed belts is roughly grouped into a belt break by the occurrence of cracks due to flexural fatigue of the tension member or insufficient heat resistance of the rubber and a tooth crack attributable to wear of the cover fabric (tooth fabric) covering the tooth part. As the measure against the belt break due to flexural fatigue of the tension member, it has been proposed to properly set the occupancy of the tension member in the belt width direction and to set the twist factor defined by the number of twists and size (fineness) of the tension member (see, for example, Patent Document 1). As the measure against the belt break due to insufficient heat resistance of the rubber, it has been proposed to use an unsaturated carboxylic acid metal salt-containing hydrogenated acrylonitrile-butadiene rubber as a matrix rubber and to add a heat-resistant short fiber or the like thereto (see, for example, Patent Document 2). As the measure against the tooth crack attributable to wear of the tooth fabric, it has been proposed to use a fluorine-based fiber having a low friction coefficient as a weft yarn of the tooth fabric (see, for example, Patent Document 3). For the warp and weft yarns of the tooth fabric, a multifilament yarn obtained by converging a plurality of filaments is generally used.

The cover fabric covering at least a part of the rubber-made belt body is generally subjected to an adhesion treatment such as resin treatment with isocyanate or the like, resorcin-formaldehyde-latex (RFL) treatment, and rubber cement treatment, in order to enhance the adherability to the rubber. By performing such an adhesion treatment, the adhesion treating solution is impregnated into and attached to the surface of the yarn forming the cover fabric or the space between filaments constituting the yarn, and the attached adhesive component is fixed after drying.

Patent Document 1: JP-A-2009-257344
Patent Document 2: JP-A-2008-291205
Patent Document 3: JP-A-2005-240862

SUMMARY OF THE INVENTION

The toothed belt described in Patent Document 3 using a fluorine-based fiber as a weft yarn of the tooth fabric can make the friction coefficient on the working surface low and can prevent the tooth crack attributable to wear of the tooth fabric, but the fluorine-based fabric has poor blendability with the adhesion treating solution and also has poor wettability. Therefore, it is found that even though the adhesive component is seemingly fixed to the tooth fabric, when the belt is caused to run, the adhesive compound flies apart from the surface of the tooth fabric engaging with the pulley teeth. The scattered adhesive component had been present on the multifilament yarn surface or between filaments of the fluorine-based fiber, and as the load on the running belt becomes higher, the amount of the scattered adhesive component increases.

When the adhesive component of the adhesion treating solution flies apart in this way to emit dust during belt running, this brings about problems that not only the environment is polluted but also the scattered adhesive component may attach to the belt drive device or peripheral equipment and causes a malfunction. Also, the belt drive device provided in a production line may cause a problem that the scattered adhesive component attaches to or intrudes into products.

Under these circumstances, an object of the present invention is to enhance the abrasion resistance by reducing the friction coefficient of the cover fabric on working surface of power transmission belts and at the same time, to prevent the adhesive component of the adhesion treating solution from flying apart during belt running.

In order to attain the above-described object, the present invention provides a cover fabric for power transmission belt, which covers at least a part of working surface of a power transmission belt coming into contact or engage with a pulley and thereby transmitting power, in which the cover fabric contains a yarn, the yarn contains at least a fluorine-based fiber, and the fluorine-based fiber is formed of at least one slit yarn, and the cover fabric is subjected to an adhesion treatment.

That is, since the yarn forming the cover fabric to be adhesion-treated contains a fluorine-based fiber having a low friction coefficient, the friction coefficient of the cover fabric on working surface of the power transmission belt is reduced to enhance the abrasion resistance of the cover fabric. At the same time, since the fluorine-based fiber is formed of at least one slit yarn, the adhesive component of the adhesion treating solution attached at the adhesion treatment is prevented from remaining on the surface of the slit yarn having smooth surface and the adhesive component is prevented from flying apart during belt running.

The slit yarn can be obtained by cutting a sheet such as a film into strips of, for example, approximately from 1 to 5 mm in width and forming the strip into a yarn by heat stretching or the like. Since the production process can be shortened as compared with general synthetic fibers, the production cost is low. The cross-sectional shape of the slit yarn is not circular like a monofilament yarn but is flat. In addition, the slit yarn does not contain a plurality of filaments and has a smooth and flat surface having no fuzz, unlike in the case of a multifilament yarn. Therefore, an adhesion treating solution is not impregnated into the inside of the slit yarn, and in combination with low wettability of the fluorine-based fiber to the adhesion treating solution, the adhesive component of the adhesion treating solution scarcely remains on the surface of the slit yarn. Furthermore, disintegration or break of filaments during belt running, which is seen in the case of a multifilament yarn, does not occur, so that the friction coefficient on working surface can be kept low for a long time and the durability of the belt can be more enhanced.

The fluorine-based fiber is not particularly limited, and examples thereof include polytetrafluoroethylene (PTFE), tetrafluoroethylene-hexafluoropropylene copolymer (FEP), tetrafluoroethylene-perfluoroalkoxylene copolymer (PFA), and tetrafluoroethylene-ethylene copolymer (ETFE).

The form of the cover fabric is also not particularly limited, and examples thereof include a woven fabric, a knitted fabric, and a nonwoven fabric. Among these, in the toothed belt, a woven fabric and a knitted fabric are preferred, and a woven fabric is most preferred.

The adhesion treatment preferably contains at least a resorcin-formaldehyde-latex (RFL) treatment. The RFL solution is an aqueous treating solution and because it has poor blendability particularly into a fluorine-based fiber and has low wettability, the RFL solution is likely to be repelled on the surface of the fluorine-based fiber. Therefore, by conducting RFL treatment, the adhesive component can be made to less remain on the surface of the fluorine-based fiber. Since the RFL solution can effectively act as an adhesive on a fiber other than the fluorine-based fiber, such as polyamide fibers and polyester fibers, the adhesiveness between the cover fabric and the rubber-made belt body can be increased.

Also, the present invention provides a toothed belt containing:

a belt body including a plurality of tooth parts disposed at predetermined intervals along the circumferential direction of the belt and a back part having embedded therein a tension member; and a tooth fabric covering the surface of the plurality of tooth parts, in which the tooth fabric is a woven fabric containing weft yarns arranged in the circumferential direction of the belt and warp yarns arranged in the width direction of the belt and subjected to an adhesion treatment, and the weft yarn contains at least a fluorine-based fiber, and the fluorine-based fiber is formed of at least one slit yarn.

That is, since the tooth fabric is a woven fabric produced by weaving weft yarns arranged in the circumferential direction of the belt and warp yarns arranged in the width direction of the belt and subjected to an adhesion treatment, and since the weft yarn contains a fluorine-based fiber having a low friction coefficient, the friction coefficient of the tooth fabric in the tooth part of the toothed belt can be reduced to enhance the abrasion resistance. At the same time, since the fluorine-based fiber is formed of at least one slit yarn, the adhesive component of the adhesion treating solution is prevented from remaining on the surface of the slit yarn and the adhesive component of the adhesion treating solution is prevented from flying apart during belt running.

The woven fabric is a fabric woven by interlacing warp yarns and weft yarns to run vertically and horizontally under a given rule and finished in a flat form. The texture of the woven fabric is not particularly limited, and examples thereof include twill weave (twill), sateen weave, and plain weave. In general, the yarn woven in the longitudinal direction of the woven fabric is called a warp yarn, and the yarn woven in the width direction is called a weft yarn. However, in the present invention, weft yarns are arranged in the circumferential direction (longitudinal direction) of the belt, warp yarns are arranged in the width direction of the belt, and the weft yarns contain the fluorine-based fiber formed of at least one slit yarn.

The weft yarn containing a fluorine-based fiber formed of at least one slit yarn may be composed by combining with at least one kind of another fiber. As for the combination, the fluorine-based fiber formed of at least one slit yarn may be mix-twined with another fiber, or these fibers may be parallely arranged. In the case where a polyurethane elastic yarn or an elastic yarn such as woolie finish stretched yarn is used as the another fiber, it may also be possible that the elastic yarn and the fluorine-based fiber are parallely arranged under stretching to form a core yarn and the periphery of the core yarn is covered with another fiber to obtain a covering yarn.

Examples of the another fiber includes a natural fiber such as cotton, hemp and silk, a regenerated fiber such as rayon, an organic fiber such as aliphatic polyamide fibers (e.g., 6-nylon, 66-nylon, 46-nylon), polyester fibers (e.g., polybutylene terephthalate, polyethylene terephthalate, polyethylene naphthalate), polyethylene fibers, polyacrylic fibers, polyvinyl alcohol fibers, poly-p-phenylene benzobisoxazole (PBO) fibers, and aromatic polyamide fibers (p-aramid, m-aramid), and an inorganic fiber such as carbon fiber and glass fiber.

Also, as the another fiber, a low-melting-point fiber capable of softening or melting at a temperature not more than the vulcanization temperature of rubber may be disposed in the periphery of the fluorine-based fiber. In this case, the low-melting-point fiber may be allowed to act as a binder of the fluorine-based fiber to rubber during vulcanization of the rubber, whereby adhesiveness between the fluorine-based fiber poor in adherability to rubber and the rubber can be improved and break of the fluorine-based fiber during belt running can be more suppressed.

The vulcanization conditions for rubber, such as vulcanization temperature and vulcanization time, are not particularly limited and are determined by taking into account the kinds of chemicals contained in the rubber composition of the belt body, such as vulcanizing agent and vulcanization accelerator, or vulcanization means. Usually, these conditions are determined by referring to the vulcanization curve measured by using a Mooney viscometer or other vulcanization behavior measuring devices. The thus-determined general vulcanization conditions may be a vulcanization temperature of 100° C. to 200° C. and a vulcanization time of approximately from 1 minute to 5 hours. If desired, secondary vulcanization may be performed.

As for the low-melting-point fiber, a fiber capable of softening or melting at the above-described vulcanization temperature is selected. For example, one of a polyamide fiber, a polyester fiber and an olefin fiber may be used, or two or more thereof may be used in combination.

The polyamide fibers include a fiber formed from copolymerized polyamides composed of a combination of a W-aminocarboxylic acid component or a dicarboxylic acid component with a diamine. This type of fiber includes, for example, FLOR-M (trade name, produced by UNITIKA Ltd.) having a melting point of 135° C.

The polyester fibers are preferably a core-in-sheath composite fiber where the core component has a melting point higher than the vulcanization temperature and the sheath component has a melting point lower than the vulcanization temperature. Examples of the polyester polymer as the core component having a melting point higher than the vulcanization temperature include polyethylene terephthalate, polybutylene terephthalate, and a copolymer thereof. The copolymerized polyester as the sheath component having a melting point lower than the vulcanization temperature can be obtained by a polycondensation reaction of a dibasic acid with a diol. Examples of the dibasic acid used for the polycondensation reaction include terephthalic acid, isophthalic acid, adipic acid, and sebacic acid, and examples of the diol include diethylene glycol, butanediol, hexanediol, polyethylene glycol, and neopentyl glycol. The melting point can be adjusted by the combination and copolymerization ratio thereof. This type of fiber includes, for example, CORNETER (trade name, produced by UNITIKA Ltd.) where the melting point of the core component is 256° C. and the melting point of the sheath component is 160° C. Incidentally, only the sheath component having a melting point lower than the vulcanization temperature may be also used alone by omitting the core component.

Examples of the olefin fibers include a polypropylene fiber and a polyethylene fiber (high-density polyethylene fiber, medium-density polyethylene fiber, low-density polyethylene fiber, linear low-density polyethylene fiber, ultrahigh-molecular polyethylene fiber). This type of fiber include, for example, DYNEEMA (trade name, produced by TOYOBO Co., Ltd.) having a melting point of 140° C.

The low-melting-point fiber is not limited to the above-described materials or configurations and use can be made of any fibers so long as the fiber is capable of softening or melting at the vulcanization temperature of the belt body. Also, the surface of the low-melting-point fiber may be subjected to a plasma treatment or the like for the purpose of increasing affinity for the adhesion treating agent.

The warp yarn is not particularly limited, and the same fibers as exemplified for the weft yarn may be used alone or in combination. Among them, fibers having good adherability to rubber are preferred, and aliphatic polyamide fibers are more preferred.

The form of the fiber used for the warp and weft yarns is not particularly limited except for the fluorine-based fiber of slit yarn used for the weft yarn, and use can be made of a filament yarn (monofilament, multifilament), a spun yarn, a slit yarn and the like alone or in combination. Incidentally, the fluorine-based fiber used for the weft yarn may partially contain a filament yarn or the like in addition to the slit yarn.

The adhesion treatment is, as described above, performed for the purpose of increasing the adhesiveness of rubber of the belt body to the tooth fabric as a cover fabric. As this adhesion treatment, there may be mentioned a method of dip-treating the tooth fabric in a resin-based treating solution obtained by dissolving epoxy or isocyanate in an organic solvent (e.g., toluene, xylene, methyl ethyl ketone), a method of dip-treating the tooth fabric in an aqueous treating solution such as RFL solution, and a method of dissolving a rubber composition in the above-mentioned organic solvent to obtain a rubber cement and dip-treating the tooth fabric in the rubber cement, thereby allowing the rubber composition to impregnate into and attach to the tooth fabric. These three kinds of methods can be performed singly or in combination, and the order of treatments and the number of treatments are not particularly limited. Furthermore, in order to more increase the adherability of the adhesion-treated tooth fabric to rubber, a friction treatment of passing the tooth fabric and a rubber composition between calender rolls to imprint the rubber composition on the tooth fabric, or a coating treatment of laminating a rubber composition on the tooth fabric at the adhering surface side to tooth part, may be applied.

When the tooth fabric has a multiple weave structure formed by weaving a warp yarn and at least two kinds of weft yarns, in which the warp yarn contains an aliphatic polyamide fiber and out of the at least two kinds of weft yarns, the weft yarn located on the outermost surface side (pulley side) of the tooth fabric contains the above-described fluorine-based fiber, the friction coefficient on the surface of the tooth fabric can be reduced, to thereby enhance the abrasion resistance of the tooth fabric, and at the same time, noise generation at the meshing or demeshing between the tooth part of the belt and the tooth of the pulley can be prevented. Also, when a fiber other than the fluorine-based fiber is used for the weft yarn located on the back surface side of the tooth fabric, which is adhered to the tooth part, and an aliphatic polyamide fiber having high adherability is used for the warp yarn, the adhesiveness between the tooth fabric and the tooth part of the belt can be more improved.

The adhesion treatment preferably contains at least a resorcin-formaldehyde-latex (RFL) treatment. Since the RFL solution has poor blendability particularly into a fluorine-based fiber and has low wettability, the RFL solution is likely to be repelled on the surface of the fluorine-based fiber. Therefore, by conducting RFL treatment, the adhesive component can be made to less remain on the surface of the fluorine-based fiber. Since the RFL solution can effectively act as an adhesive on a fiber other than the fluorine-based fiber, such as polyamide fibers and polyester fibers, the adhesiveness between the tooth fabric and the tooth part of the belt can be increased.

In the cover fabric for power transmission belt according to the present invention, the yarn forming the cover fabric to be adhesion-treated contains a fluorine-based fiber having a low friction coefficient and the fluorine-based fiber is formed of at least one slit yarn. Therefore, the friction coefficient of the cover fabric on working surface of the power transmission belt can be reduced to increase the abrasion resistance and durability of the belt can be enhanced. At the same time, the adhesive component of the adhesion treating solution can be prevented from flying apart during belt running.

Also, in the toothed belt according to the present invention, the tooth fabric is a woven fabric produced by weaving weft yarns arranged in the circumferential direction of the belt and warp yarns arranged in the width direction of the belt and subjected to an adhesion treatment, the well yarn contains a fluorine-based fiber having a low friction coefficient, and the fluorine-based fiber is formed of at least one slit yarn. Therefore, the friction coefficient of the tooth fabric in the tooth part of the toothed belt can be reduced to enhance the abrasion resistance and the durability of the belt can be enhanced. At the same time, the adhesive component of the adhesion treating solution can be prevented from flying apart during belt running. Therefore, the toothed belt according to the present invention can prevent environmental contamination or malfunction of the belt drive device or peripheral equipment due to attachment of the adhesive component thereto, and in the belt drive device provided in the production line, the toothed belt can prevent attachment or intrusion of the adhesive component to or into the product.

DESCRIPTION OF REFERENCE NUMERALS AND SIGNS

Figure 1:
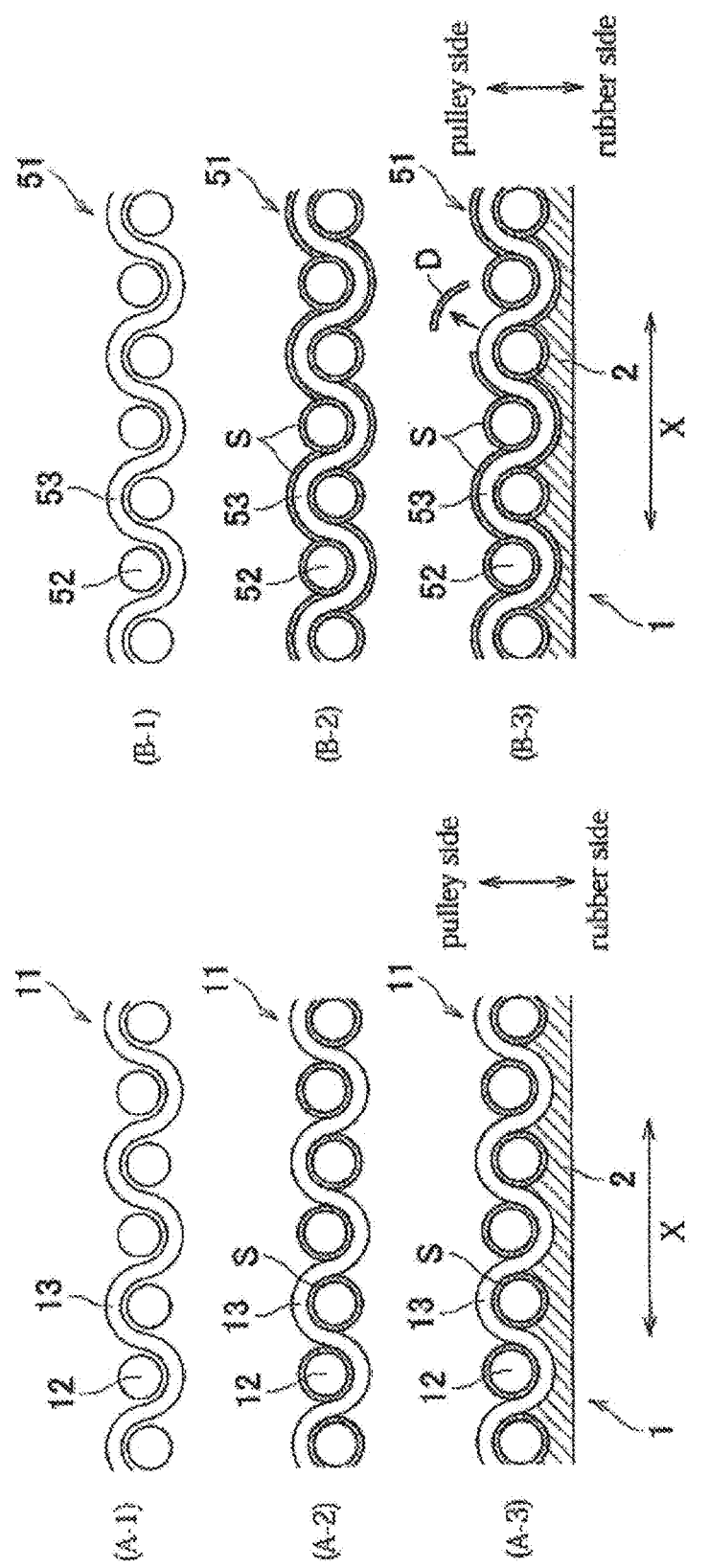
FIGS. 1-(A-1) to (A-3) are schematic longitudinal cross-sectional views for explaining the cover fabric for power transmission belt according to the present invention, and FIGS. 1-(B-1) to (B-3) are schematic longitudinal cross-sectional views for explaining the conventional cover fabric for power transmission belt.

1 Power transmission belt, toothed belt
2 Belt body
2a Tooth part
2b Back part
3 Tension member
4 Adhesion layer
11, 51 Cover fabric, tooth fabric
12, 52 Warp yarn
13, 53 Weft yarn
30 Biaxial running test machine
31 Driving pulley
32 Driven pulley
33 Cardboard
X Circumferential direction of the belt
S Adhesive component
D Dusted substance

DETAILED DESCRIPTION OF THE INVENTION

The embodiment of the present invention is described below by referring to drawings. FIGS. 1-(A-1) to (A-3) show a cover fabric 11 for power transmission belt of one embodiment according to the present invention, and FIGS. 1-(B-1) to (B-3) show a conventional cover fabric 51 for power transmission belt. Both of the cover fabrics 11 and 51 are woven fabrics produced by weaving a warp yarn 12 or 52 and a weft yarn 13 or 53 as shown in the top figure (FIGS. 1-(A-1) and (B-1)), and the woven fabrics are subjected to an adhesion treatment with an RFL solution as shown in the middle figures (FIGS. 1-(A-2) and (B-2)). And then, the woven fabrics are attached to a rubber-made belt body 2 so as to cover the working surface of a power transmission belt 1 as shown in the bottom figures (FIGS. 1-(A-3) and (B-3)).

The woven fabric for each of the cover fabrics 11 and 51 is produced by weaving such as twill weaving, sateen weaving or plain weaving, and is sometimes made to have a multiple weave structure by using two or more kinds of weft yarns 13 and 53. However, for simplifying the following description, the cross-section of a plain woven fabric having a single weave structure is schematically shown here. In each of the figures, the left/right direction (direction of arrow X) is the circumferential direction of the belt. Each warp yarn 12 or 52 is arranged to extend in the belt width direction, and each weft yarn 13 or 53 is arranged to extend in the circumferential direction of the belt.

The cover fabric 11 according to the present invention and the conventional cover fabric 51 are different in that the weft yarn 53 of the conventional cover fabric 51 is formed of a multifilament yarn of a fluorine-based fiber, whereas the weft yarn 13 of the cover fabric 11 according to the present invention is formed of a slit yarn of a fluorine-based fiber. The rest of the configuration may be the same, and the warp yarns 12 and 52 both are made of a nylon fiber.

As shown in the middle figures (FIGS. 1-(A-2) and (B-2)) after adhesion treatment with RFL solution, an adhesive component S of the RFL solution attaches to and remains on the surface of the weft yarn 53 formed of a multifilament yarn of a fluorine-based fiber, whereas the adhesive component S of the RFL solution does not remain on the surface of the weft yarn 13 formed of a slit yarn of a fluorine-based fiber. Although not shown, in the weft yarn 53 formed of a multifilament yarn, the adhesive component S remains also in the space between filaments. As described above, a fluorine-based fiber has particular poor blendability with the RFL solution, and the RFL solution is likely to be repelled on the surface of the fiber. However, since the weft yarn 53 formed of a multifilament yarn has fuzzes observed on the surface thereof, the adhesive component S attaches and remains between the surface and the filament without being firmly fixed. On the other hand, the weft yarn 13 formed of a slit yarn has no plurality of filaments and therefore, has a smooth and flat surface having no fuzz, the adhesive component S is not attached and does not remain. Incidentally, the adhesive component S is firmly fixed to the surface of each warp yarn 12 or 52 formed of an aliphatic polyamide fiber well blendable with the RFL solution.

As shown in the bottom figures (FIGS. 1-(A-3) and (B-3)) after adhesion to a belt body 2, in the conventional cover fabric 51 using a weft yarn 53 formed of a multifilament yarn, when the working surface of the belt comes into contact or engage with a pulley (not shown) during belt running, the adhesive component S attached to the working surface side of the weft yarn 53 flies apart as a dusted substance D. On the other hand, in the cover fabric 11 according to the present invention using a weft yarn 13 formed of a slit yarn, since the adhesive component S does not remain on the surface of the weft yarn 13, such a dusted substance D does not fly apart.

Although not shown, when the cover fabric 11 according to the present invention is formed by a woven fabric having a multiple weave structure using two or more kinds of fibers for the weft yarn 13, it is preferred that the weft yarn located on the outermost surface side (pulley side) of the working surface is formed of a slit yarn of a fluorine-based fiber and the weft yarn(s) located on the inner surface side is made of another fiber such as aliphatic polyamide fiber. Also in this case, since the adhesive component S does not remain on the surface of the weft yarn formed of a slit yarn located on the outermost surface side of the working surface and coming into contact or engage with the pulley, a dusted substance D does not fly apart. Furthermore, since the adhesive component S is fixed on the weft yarn(s) formed of another fiber located on the inner surface side, the cover fabric 11 can be more firmly adhered to the belt body 2.

Figure 2:
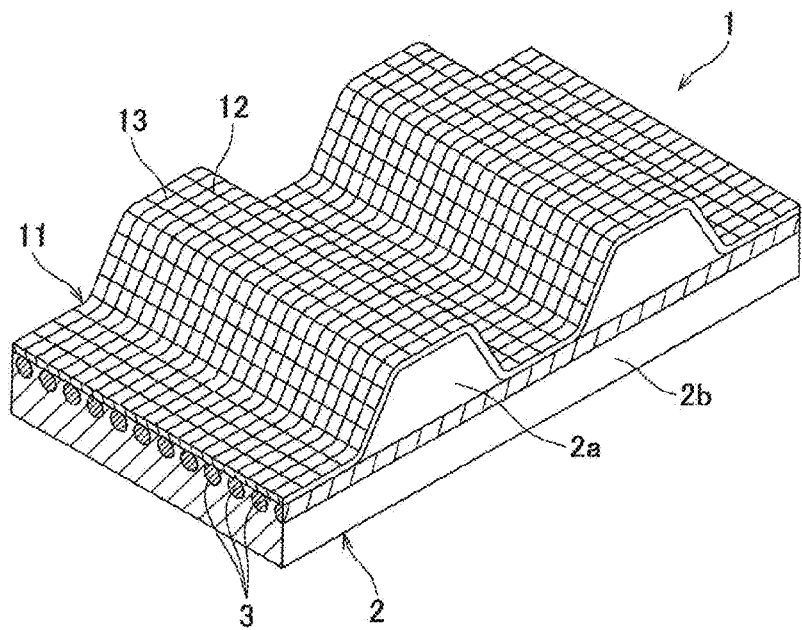
FIG. 2 is a cutaway perspective view showing an embodiment of the toothed belt of the present invention.

FIG. 2 shows an embodiment of a toothed belt 1 as a power transmission belt. In the toothed belt 1, tooth parts 2a engaging with teeth of a pulley are provided in the circumferential direction of a rubber-made belt body 2 at predetermined intervals, a tension member 3 is embedded in the back part 2b lying in the circumferential direction on the back side of the belt, and the entire tooth parts 2a serving as working surface are covered with the tooth fabric 11 which is a cover fabric containing the above-described weft yarn 13 formed of a slit yarn of a fluorine-based fiber. The warp yarn 12 of the tooth fabric 11 is arranged in the width direction of the belt, and the weft yarn 13 is arranged in the circumferential direction of the belt.

The rubber component used for the belt body 2 includes a vulcanizable or crosslinkable rubber, for example, natural rubber, diene rubbers (e.g., isoprene rubber, butadiene rubber, chloroprene rubber, styrene butadiene rubber, acrylonitrile-butadiene rubber, hydrogenated acrylonitrile-butadiene rubber), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, and fluorinated rubbers. One of these components may be used alone, or two or more thereof may be used in combination. Among these, hydrogenated acrylonitrile-butadiene rubbers (particularly, a hydrogenated acrylonitrile-butadiene rubber having dispersed therein a carboxylic acid metal salt), chlorosulfonated polyethylene rubbers, alkylated chlorosulfonated polyethylene rubbers, and chloroprene rubbers are preferred because of their excellent heat aging resistance.

As the fiber constituting the tension member 3, in view of high modulus, use can be made of a synthetic fiber such as polyester fibers having a $C_{2-4}$ alkylene arylate such as ethylene terephthalate, ethylene-2,6-naphthalate as a main constituent unit (for example, polyalkylene arylate fibers, polyethylene terephthalate fibers and ethylene naphthalene fibers), and aromatic polyamide fibers, and an inorganic fiber such as glass fibers and carbon fibers. Among these, glass fibers, carbon fibers and aromatic polyamide fibers are preferred, and carbon fibers are most preferred. Such a fiber may be a multifilament yarn.

The rubber composition of the belt body 2 may contain additives if desired. Examples of the additives include vulcanizing or crosslinking agents, co-crosslinking agents, vulcanization aids, vulcanization accelerators, vulcanization retarders, metal oxides (e.g., zinc oxide, magnesium oxide, calcium oxide, barium oxide, iron oxide, copper oxide, titanium oxide, and aluminum oxide), reinforcing materials (e.g., carbon black and silicon oxide such as hydrous silica), short fibers, fillers (e.g., clay, calcium carbonate, talc, and mica), softening agents (e.g., oils such as paraffin oil and naphthene oil), processing agents or processing aids (e.g., stearic acid, stearic acid metal salt, wax, paraffin, and fatty acid amide), antioxidants (e.g., antioxidants, heat aging inhibitors, bend cracking inhibitors, and ozone deterioration inhibitors), coloring agents, tackifiers, plasticizers, coupling agents (e.g., silane coupling agents), stabilizers (e.g., ultraviolet absorbers and heat stabilizers), flame retardants, antistatic agents. These additives may be used alone or in combination.

As the short fiber blended in the rubber composition, use can be made of a synthetic fiber such as polyolefin fibers (e.g., polyethylene fiber and polypropylene fiber), polyamide fibers (e.g., 6-nylon fiber, 66-nylon fiber, 46-nylon fiber, and aramid fiber), polyalkylene arylate fibers (e.g., $C_{2-4}$ alkylene $C_{6-14}$ arylate fibers such as polyethylene terephthalate fiber and polyethylene naphthalate fiber), vinylon fibers, polyvinyl alcohol fibers, and polyparaphenylene benzobisoxazole fiber; a natural fiber such as cotton, hemp and wool; and an inorganic fiber such as carbon fiber. In the case of blending such a short fiber in the rubber composition forming the tooth part 2a, it may be also possible that the short fiber is flowed in the rubber composition together with the rubber component during vulcanization, and is oriented along the contour of the tooth part 2a in the vicinity of the tooth part 2a surface and oriented almost in parallel with the tension member 3 as it comes close to the tension member 3.

The toothed belt 1 can be produced by the following known method. First, a tooth fabric 11 adhesion-treated with an RFL solution is wound around a cylindrical mold having formed, in its outer circumference, a plurality of grooves corresponding to tooth parts 2a of the toothed belt 1 to be produced. A tension member 3 is spirally spun on the outer circumference of the tooth fabric 11, and an unvulcanized rubber sheet for forming the tooth parts 2a and back part 2b of a belt body 2 is fixed on the further outer circumference in a wraparound manner to produce an assembled body. Thereafter, a vulcanization jacket is applied thereover from the outer circumferential side of the assembled body, and the mold covered with the vulcanization jacket is placed in a vulcanizer and heated/pressurized under predetermined conditions, as a result, the fluidized rubber is press-fit into the grooves of the mold through a gap between tension members 3 and at the same time, the tooth fabric 11 is pressed to the grooves to cover the tooth parts 2a with the tooth fabric 11, whereby a sleeve-like vulcanized molded body having embedded in the back part 2b thereof a tension member 3 can be obtained. This vulcanized molded body is cut into rounds of a predetermined product width to produce individual toothed belts 1.

Figure 3:
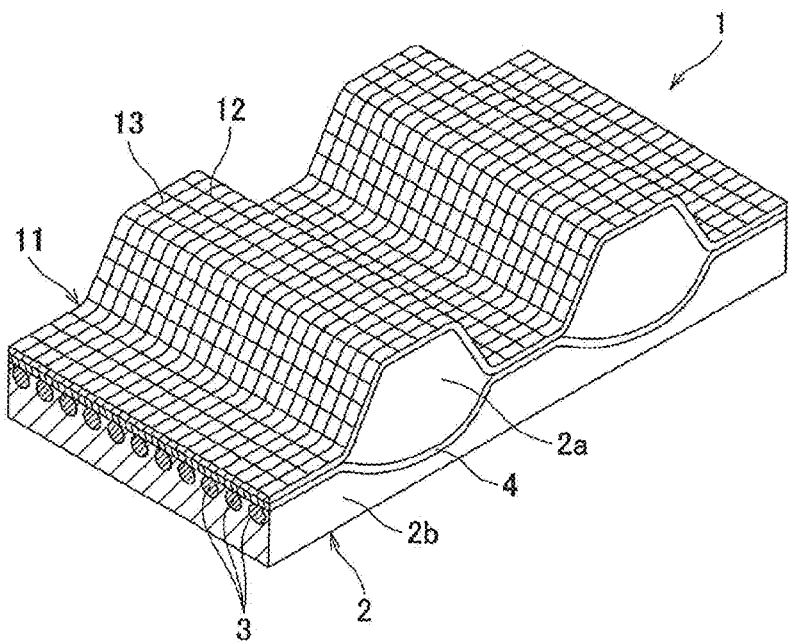
FIG. 3 is a cutaway perspective view showing a modification embodiment of the toothed belt shown in FIG. 2.

FIG. 3 shows a modification embodiment of the toothed belt 1. In this modification embodiment, an adhesion layer 4 is provided between the tooth part 2a and the back part 2b of the belt body 2, and the adhesion layer 4 in the portion contacting with the tooth part 2a is bulged toward the back part 2b side. The adhesion layer 4 may be made to bulge toward the tooth part 2a side. The rest of the configuration is the same as in the embodiment above, and the weft yarn 13 of the tooth fabric 11 covering the tooth part 2a is formed of a slit yarn of a fluorine-based fiber. Also, the warp yarn 12 of the tooth fabric 11 is arranged in the width direction of the belt, and the weft yarn 13 is arranged in the circumferential direction of the belt.

The adhesion layer 4 is made of a rubber composition. As the rubber composition, for example, hydrogenated acrylonitrile-butadiene rubber (HNBR) can be used. Further, the rubber composition may contain a vulcanizing agent such as an organic peroxide, a vulcanization aid such as maleimide, a vulcanization accelerator, a reinforcing material such as carbon black and silica, a filler, a softening agent, a processing aid, an antioxidant, and the like, if desired.

The toothed belt 1 of the modification embodiment can be produced by the following method. This production method is called a preforming method, and first, a tooth fabric 11 covering tooth parts 2a and tooth parts 2a are preformed by using a cylindrical mold having formed, in its outer circumference, a plurality of grooves. The preformed body obtained by this preforming step is not completely vulcanized and is in a semi-vulcanized state. Then, a tension member 3 is spirally spun on the outer circumference of the preformed body, and an unvulcanized rubber sheet for forming the back part 2b of a belt body 2 is wound around the further outer circumference. Thereafter, the entirety is heated and vulcanized in a vulcanizer to obtain a sleeve-like vulcanized molded body. This vulcanized molded body is cut into rounds of a predetermined product width, similarly to the embodiment.

In the production method by the preforming method, it is not necessary to pass the fluidized rubber through a gap between tension members 3 during vulcanization to form a tooth part 2a, unlike in the above-described known method that is used widely. Therefore, the distance (pitch) between tension members 3 can be made narrow. Accordingly, in the case of producing a high-modulus toothed belt 1, the preforming method is preferred, because the tension member pitch in the width direction of the belt can be reduced almost to the diameter of the tension member. Incidentally, the preforming method is not required to provide the adhesion layer 4 shown in FIG. 3 and is applicable also to the toothed belt 1 having the configuration shown in FIG. 2.

EXAMPLES

A toothed belt having a tooth part 2a covered with a tooth fabric 11 where the weft yarn 13 on the outermost surface side is formed of a slit yarn of a fluorine-based fiber as schematically shown in FIGS. 1-(A-1) to (A-3), was prepared as Example. Also, a similar toothed belt having a tooth part 2a covered with a tooth fabric 51 where the weft yarn 53 on the outermost surface side is formed of a multifilament yarn of a fluorine-based fiber as schematically shown in FIG. 1-(B-1) to (B-3), was prepared as Comparative Example. The configuration and used materials of the tooth fabrics 11 and 51 of Example and Comparative Example are shown in Table 1. Although not shown in the figures, the tooth fabrics 11 and 51 of Example and Comparative Example both have a double weave structure of twill weave using two kinds of fibers for each of the weft yarns 13 and 53 (as for the weave texture, the outermost surface side is a 1/3 twill, and the inner surface side is a 2/2 twill). As the weft yarn on the outermost surface side (pulley side), a covering yarn obtained by parallely arranging the slit yarn or multifilament yarn above and a polyurethane elastic yarn to form a core yarn and disposing a low-melting-point fiber in the periphery of the core yarn was used. Also, in both tooth fabrics, the weft yarn on the inner surface side (rubber adhesion side) was a 66-nylon fiber arranged with a polyurethane elastic yarn. For both of the warp yarns 12 and 52, a 66-nylon fiber was used.

TABLE 1

| Item | EXAMPLE | | COMPARATIVE EXAMPLE | |
|---|---|---|---|---|
| Weave structure | double weave | | double weave | |
| | surface side (pulley side) | inner surface side (rubber side) | surface side (pulley side) | inner surface side (rubber side) |
| Weave texture | 1/3 twill | 2/2 twill | 1/3 twill | 2/2 twill |
| Warp yarn | 66-nylon fiber | | 66-nylon fiber | |
| Weft yarn | fluorine-based fiber *1 (slit yarn) | 66-nylon fiber *4 | fluorine-based fiber *2 (multifilament yarn) | 66-nylon fiber |
| | low-melting-point fiber *3 | | low-melting-point fiber | |
| | urethane elastic yarn *5 | urethane elastic yarn | urethane elastic yarn | urethane elastic yarn |
| Adhesion treatment | RFL treatment | | RFL treatment | |
| Durability life | 153 hours | | 70 hours | |

*1 Three-ply "YUMIFRON (440 dtex)" produced by YMT Co., Ltd.
*2 "TOYOFLON (1,330 dtex)" produced by TORAY FINE CHEMICALS Co., Ltd.
*3 "CORNETER" produced by UNITIKA Ltd.
*4 "LEONA 66" Produced by ASAHI KASEI CHEMICALS Corp.
*5 "SPANDEX" produced by FUJI SPINNING Co., Ltd.

Each of the toothed belts of Example and Comparative Example was the same as the toothed belt of FIG. 2 produced by the known method above, and the vulcanization conditions were a vulcanization temperature of 165° C. and a vulcanization time of 30 minutes. As for the specification of each toothed belt, the tooth type was S14M, the number of belt teeth was 100, the belt circumferential length was 1,400 mm, and the belt width was 25 mm.

Each of the tooth fabrics 11 and 51 of Example and Comparative Example was adhesion-treated with the same RFL solution and thereafter, adhered to a belt body 2 through a rubber for coating treatment having the same rubber composition. Table 2 shows the composition of the RFL solution used for the adhesion treatment, and Table 3 shows the rubber composition the rubber for coating treatment.

TABLE 2

| Composition Material | parts by mass |
|---|---|
| HNBR Latex (40 wt %) *1 | 100 |
| RF Condensate (20 wt %) *2 | 25 |
| Aqueous NaOH solution (10 wt %) | 2 |
| Water dispersion of maleimide compound (50 wt %) | 20 |
| Water | 110 |
| Total | 257 |

*1 Latex produced by ZEON CORPORATION
*2 R/F Molar ratio: 1/1.5

TABLE 3

| Composition Material | parts by mass |
|---|---|
| HNBR *1 | 50 |
| HNBR *2 | 50 |
| Zinc oxide | 2 |
| Stearic acid | 1 |
| Silica | 50 |
| Carbon black | 5 |
| Antioxidant | 2 |
| Vulcanization aid *3 | 2 |
| Organic peroxide *4 | 2 |
| Polyether plasticizer | 10 |
| Total | 174 |

*1 "ZETPOL 2010L" produced by ZEON CORPORATION
*2 "ZSC 2295N" produced by ZEON CORPORATION
*3 Maleimide compound
*4 1,3-Bis(t-butylperoxyisopropyl)benzene: 40 wt % and calcium carbonate: 60 wt %

Figure 4:
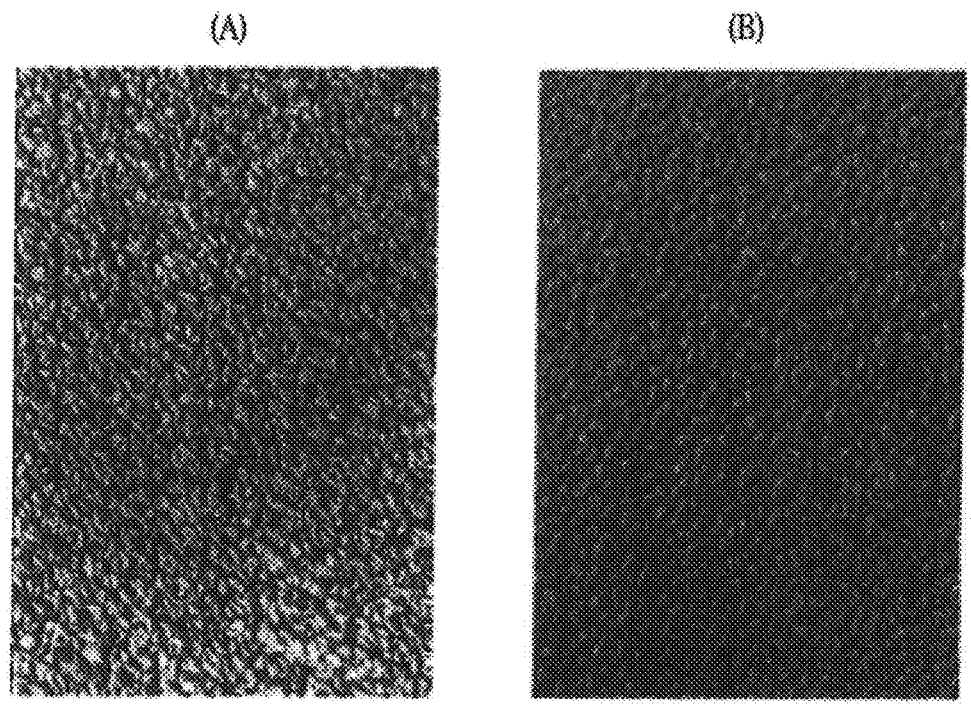
FIGS. 4-(A) and (B) are photographs of the surfaces (pulley side) of tooth fabrics of Example (FIG. 4-(A)) and Comparative Example (FIG. 4-(B)) after adhesion treatment.

FIGS. 4-(A) and (B) are photographs of the surfaces (surfaces on the pulley side) of tooth fabrics 11 and 51 of Example and Comparative Example after adhesion treatment, taken with a microscope. It can be found from FIG. 4-(B) that all over the surface of the tooth fabric 51 of Comparative Example was dark and the black adhesive component S of the RFL solution attached in a large amount. On the other hand, as shown in FIG. 4-(A), the tooth fabric 11 of Example had many white portions, revealing that the adhesive component S scarcely attached to the slit yarn of a fluorine-based fiber used for the weft yarn on the outermost surface side and a white fluorine-based fiber was exposed. Incidentally, the portion looking dark in the tooth fabric 11 of Example was the adhesive component S of the RFL solution attached to other fibers such as warp yarn 12.

A belt running test of causing each of the toothed belts prepared in Example and Comparative Example to run until the durability life thereof terminates was performed, whereby the durability of each toothed belt was evaluated and at the same time, a dusted substance D of the adhesive component S flying apart during running was observed.

Figure 5:
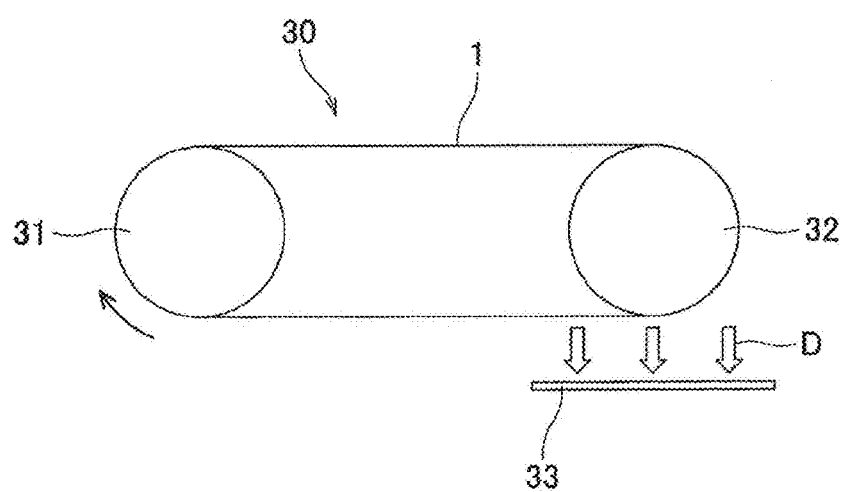
FIG. 5 is a conceptual view for explaining the belt running test.

FIG. 5 shows a biaxial running test machine 30 used for the belt running test. In this biaxial running test machine 30, the toothed belt 1 is wound onto a driving pulley 31 and a driven pulley 32 each having teeth formed on the outer circumferential surface, and while the driving pulley 31 is rotationally driven, the driven pulley 32 imparts a load on the toothed belt 1. In the belt running test, a cardboard 33 for catching a dusted substance D flying apart was spread below the driven pulley 32, and a double-sided adhesive tape (not shown) for fixing the dusted substance D caught was attached to the upper surface of the cardboard 33. The test conditions were as follows.

Number of pulley teeth: 28 (both driving pulley and driven pulley)
Belt installation tension: 800 N
Number of revolutions of driving pulley: 1,800 rpm
Load of driven pulley: 150 Nm The durability life of each of the toothed belts of Example and Comparative Example in the belt running test is shown together in Table 1. The durability life of Comparative Example is 70 hours, whereas that of Example is 153 hours which is more than twice of Comparative Example. The belt damage mode limiting the durability life was tooth crack from the bottom of tooth in both belts. It was confirmed from these results that the tooth fabric as the cover fabric for power transmission belt according to the present invention can remarkably enhance the durability of the toothed belt.

Figure 6:
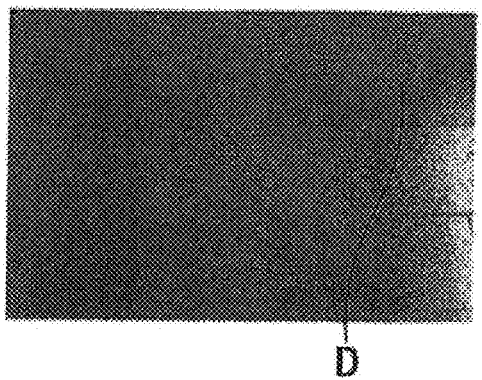
FIGS. 6-(A-1), (A-2), (B-1), and (B-2) are photographs of dusted substances of the adhesive component of Example (FIGS. 6-(A-1) and (A-2)) and Comparative Example (FIGS. 6-(B-1) and (B-2)), which had flied apart in the belt running test of FIG. 5 and fallen on a cardboard.
Figure 6:
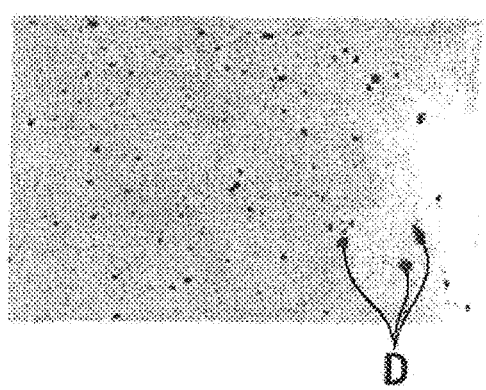
Figure 6:
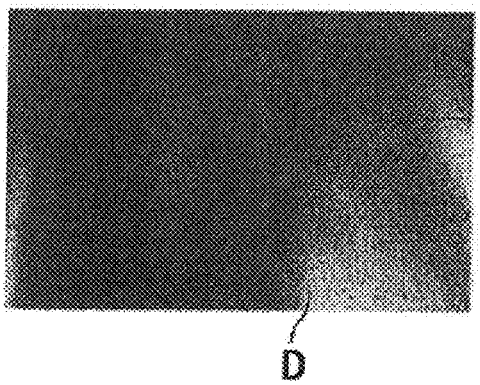
Figure 6:
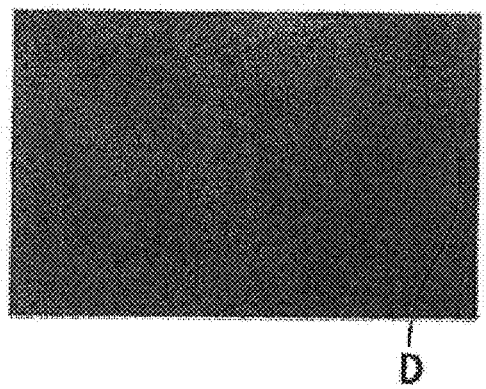

FIGS. 6-(A-1), (A-2), (B-1), and (B-2) are photographs of dusted substances D caught by the upper surface of the cardboard 33 in the belt running test above. The photographs were taken at the initial stage of running (4 hours after the initiation of running, Example: FIG. 6-(A-1), Comparative Example: FIG. 6-(B-1)) and at the end of durability life for each of Example and Comparative Example (Example: FIG. 6-(A-2), Comparative Example: FIG. 6-(B-2)). These photographs reveal that in the case of Comparative Example, the number of dusted substances D and the size thereof were large, whereas in the case of Example, the dusted substance D was scarcely observed and the size thereof was small. It was confirmed from these photograph observation results that the cover fabric for power transmission belt according to the present invention can effectively suppress the flying of the adhesive component S during belt running.

Each of the dusted substances D of Example and Comparative Example was collected after the test, and the components thereof were analyzed by infrared spectroscopy (IR). As a result of this analysis, a fluorine-based fiber was detected in addition to the adhesive component S in the dusted substance D of Comparative Example, whereas a fluorine-based fiber was not detected in the dusted substance D of Example. From these results, it is thought that in the tooth fabric of Example using a slit yarn, the fluorine-based fiber was not broken and remained on the mating surface, and the reason why the durability life of Example was long is considered because the fluorine-based fiber was not broken and the friction coefficient on the mating surface could be kept low.

In the above-described embodiment, the cover fabric for power transmission belt was a woven fabric and covers the tooth part serving as working surface of the toothed belt, but it is also possible that the cover fabric for a transmission belt according to the present invention is a knitted fabric, a nonwoven fabric or the like and used for covering working surface of other power transmission belts such as V belt, V-ribbed belt and flat belt. Also, in the case of transmitting power through the back surface of the power transmission belt, the back surface side of these power transmission belts including a toothed belt may be also covered by the cover fabric according to the present invention.

In the above-described embodiment, the entire tooth parts of the toothed belt are covered with a tooth fabric as the cover fabric for power transmission belt according to the present invention, but a part of the tooth part, for example, a widthwise central part or both edges of the tooth part, may be covered with the tooth fabric.

While the present invention has been described in detail with reference to the specific embodiments thereof, it will be apparent to one skilled in the art that various changes and modifications can be made therein without departing from the spirit and scope of the present invention.

The present application is based on the Japanese Patent Application No. 2012-136724 filed on Jun. 18, 2012, and the entire contents thereof are incorporated herein by reference. All references cited herein are incorporated in their entirety.

INDUSTRIAL APPLICABILITY

The cover fabric for power transmission belt according to the present invention can enhance the durability of the belt and can suppress the adhesive component from flying apart from the belt during belt running. Therefore, the toothed belt using the cover fabric for power transmission belt according to the present invention can extend the replacement cycle in high-load applications such as injection molding machine, and when used in the belt drive device provided in a production line, the problem that the scattered adhesive component attaches to or intrudes into products can be suppressed.

What is claimed is:

1. A cover fabric for a power transmission belt, which covers at least a part of a working surface of a power transmission belt coming into contact or engaging with a pulley to thereby transmit power,
wherein the cover fabric comprises a yarn comprising at least a fluorine-based fiber in at least one slit yarn, and the cover fabric is subjected to an adhesion treatment,
wherein the adhesion treatment contains at least a resorcin-formaldehyde-latex treatment,
wherein the at least one slit yarn has a flat cross-sectional shape.

2. The cover fabric for a power transmission belt according to claim 1,
wherein the at least one slit yarn has a smooth surface that resists adherence of an adhesive component used in the adhesion treatment.

3. The cover fabric for a power transmission belt according to claim 1,
wherein the fluorine-based fiber contains at least one polymer selected from the group consisting of polytetrafluoroethylene, tetrafluoroethylene-hexafluoropropylene copolymer, tetrafluoroethylene-perfluoroalkoxylene copolymer, and tetrafluoroethylene-ethylene copolymer.

4. A toothed belt comprising:
a belt body including a plurality of tooth parts disposed at predetermined intervals along a circumferential direction of the belt and a back part having embedded therein a tension member; and
a tooth fabric covering a surface of the plurality of tooth parts,
wherein the tooth fabric is a woven fabric comprising weft yarns arranged in the circumferential direction of the belt and warp yarns arranged in a width direction of the belt and subjected to an adhesion treatment, and
the weft yarn comprises at least a fluorine-based fiber in at least one slit yarn,
wherein the adhesion treatment contains at least a resorcin-formaldehyde-latex treatment,
wherein the at least one slit yarn has a flat cross-sectional shape.

5. The toothed belt according to claim 4,
wherein the weft yarn further contains an elastic yarn and another fiber, and
wherein the fluorine-based fiber and the elastic yarn are parallely arranged under stretching to form a core yarn and a periphery of the core yarn is covered with said another fiber.

6. The toothed belt according to claim 5,
wherein said another fiber is a low-melting-point fiber which melts under a vulcanization condition of a vulcanization temperature of from 100° C. to 200° C. and a vulcanization time of from 1 minute to 5 hours.

7. The toothed belt according to claim 4,
wherein the tooth fabric has a multiple weave structure formed of a warp yarn and at least two kinds of weft yarns, the warp yarn contains an aliphatic polyamide fiber, and out of the at least two kinds of weft yarns, the weft yarn located on an outermost surface side of the tooth fabric contains the fluorine-based fiber.

8. The toothed belt according to claim 4,
wherein the at least one slit yarn has a smooth surface that resists adherence of an adhesive component used in the adhesion treatment.

9. The toothed belt according to claim 4,
wherein the fluorine-based fiber contains at least one polymer selected from the group consisting of polytetrafluoroethylene, tetrafluoroethylene-hexafluoropropylene copolymer, tetrafluoroethylene-perfluoroalkoxylene copolymer, and tetrafluoroethylene-ethylene copolymer.

* * * * *